UNITED STATES PATENT OFFICE.

ANDRÉ WEISS, OF LYON, FRANCE, ASSIGNOR TO SOCIETE CHIMIQUE DES USINES DU RHONE, ANCIENNEMENT GILLIARD P. MONNET ET CARTIER, OF PARIS, FRANCE.

PROCESS FOR THE MANUFACTURE OF OXYALDEHYDES AND OF THEIR ETHERS.

1,345,649.     Specification of Letters Patent.     Patented July 6, 1920.

No Drawing.     Application filed January 17, 1920. Serial No. 352,088.

*To all whom it may concern:*

Be it known that I, ANDRÉ WEISS, Alsatian, a citizen of the Republic of France, of 14 Rue Pasteur, Lyon, France, have invented certain new and useful Improvements in Processes for the Manufacture of Oxyaldehydes and of Their Ethers, of which the following is a specification.

This invention relates to the manufacture of aromatic oxyaldehydes and of their ethers, and has for its object a general process consisting in causing a nitroso-compound such as nitrosobenzene, nitrosonaphthalene or p-nitrosodimethylanilin to react upon a mixture of formaldehyde with a phenol or its ether.

As a particular application of this process the manufacture of vanillin will now be described.

Guaiacol and formaldehyde are mixed together in molecular proportions and diluted with methyl or ethyl alcohol, and an alcoholic solution of hydrochloric acid and of p-nitrosodimethylanilin in half molecular proportion is added. The mixture is heated for several hours on a water bath, gaseous hydrochloric acid being bubbled through continuously meanwhile.

The resulting products give an excellent yield of vanillin with p-amidodimethylanilin as a by-product. The formed vanillin may be extracted by treating the product of the reaction after cooling with a dilute caustic soda solution, the alcohol is separated by distillation, and the p-amidodimethylanilin is then extracted with benzene or ether.

The remaining alkaline solution of vanillin is then acidified and extracted with benzene or ether, after which the solvent is distilled, the remaining crude vanillin being then distilled in vacuum and the vanillin, recrystallized in water, separates in crystals having a melting point of 81° C.

The reaction, which gives a yield of 100 per cent. of crude product with respect to the guaiacol used, is believed to take place approximately as follows:—

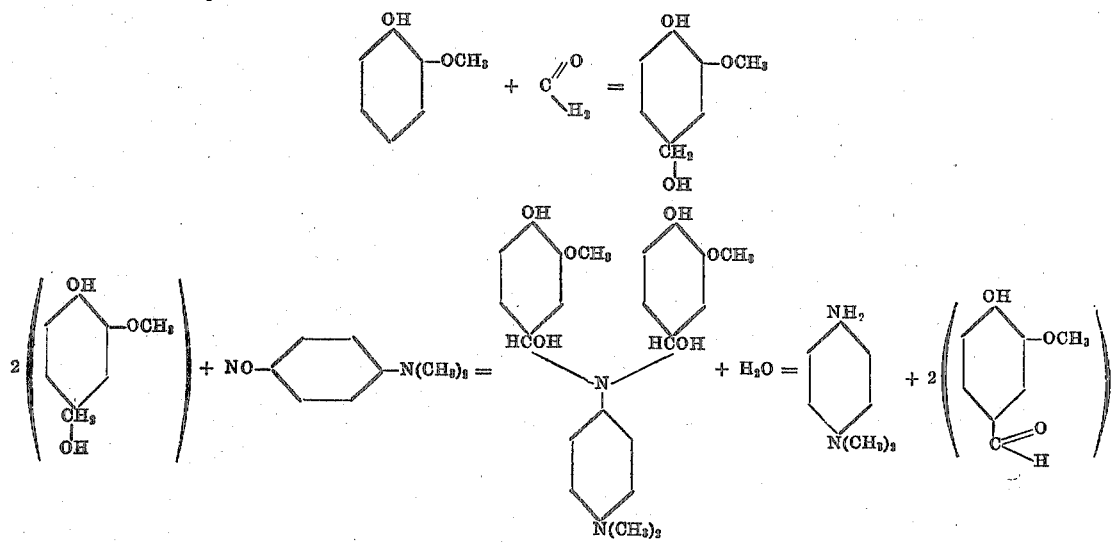

The process, which differs from all the methods of preparation known hitherto, is evidently applicable to the manufacture of anisole aldehyde, of pyrocatechin aldehyde, of salicylic aldehyde, and oxyaldehydes generally.

What I claim and desire to secure by Letters Patent is:—

1. A process of manufacture of oxyaldehydes consisting in treating a mixture of a phenol and formaldehyde with a nitroso-compound.

2. A process of manufacture of oxyaldehyde ethers, consisting in treating a mixture of a phenol ether and formaldehyde with a nitroso-compound.

3. A process of manufacture of vanillin, consisting in treating a mixture of guaiacol and formaldehyde with para-nitroso-dimethylanilin.

In testimony whereof I have signed my name to this specification.

ANDRÉ WEISS.

Witnesses:
    MARIN VACHON,
    L. ESCHER.